United States Patent Office.

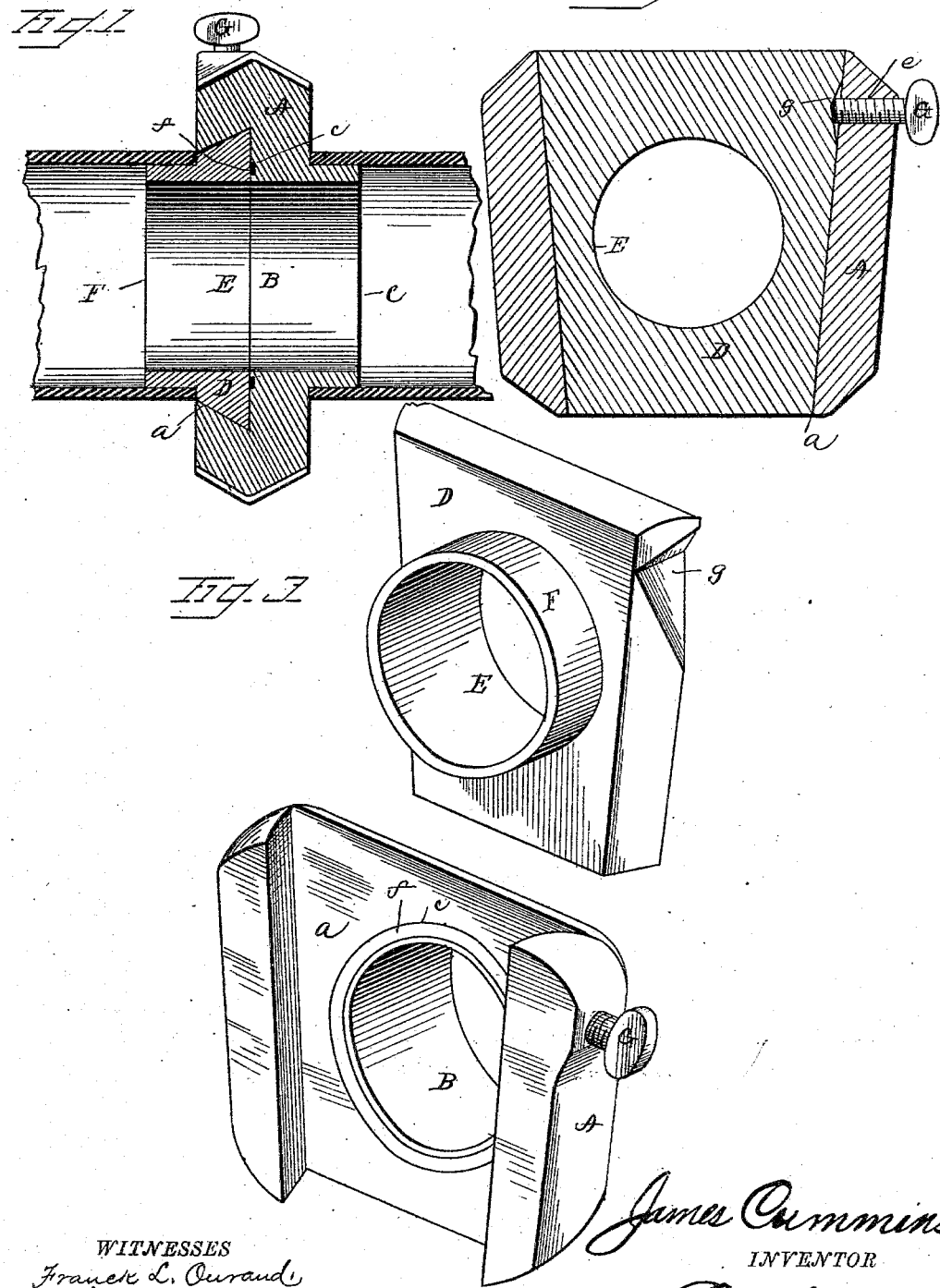

JAMES CUMMINS, OF JANESVILLE, MINNESOTA.

HOSE-COUPLING.

SPECIFICATION forming part of Letters Patent No. 295,151, dated March 18, 1884.

Application filed July 27, 1883. (No model.)

*To all whom it may concern:*

Be it known that I, JAMES CUMMINS, of Janesville, in the county of Waseca and State of Minnesota, have invented certain new and useful Improvements in Hose-Couplings; and I do hereby declare that the following is a full, clear, and exact description of the invention, such as will enable others skilled in the art to which it appertains to make and use the same, reference being had to the annexed drawings, which form a part of this specification.

This invention relates to hose-couplings; and it has for its object to provide a simple, secure, and easily-applied coupling for the joints of hose.

With these objects in view the said invention consists in forming the coupling of two parts or sections, having a dovetail-connection and secured by a thumb-screw, and in additional details of construction and combination of parts, as hereinafter set forth, and particularly pointed out in the claims.

In the accompanying drawings, Figure 1 is a longitudinal sectional view of my improvements. Fig. 2 is a detail perspective view of the parts of the coupling detached. Fig. 3 is a transverse section through the thumb-screw.

Like letters of reference indicate corresponding parts in the several figures.

Referring to the drawings, A designates one of the sections of my improved coupling, provided with a dovetailed slot, *a*, and a central opening or passage, B, a circular ring, C, being formed around the said passage in the rear face of the section, one end of the hose being connected with said ring. An annular recess or depression, *c*, is formed around the passage B in the front face of the section A, and in said recess or depression is fitted a rubber or other suitable packing, *f*, to exclude air or water when the sections are coupled together. D designates the other section of the coupling, the sides of which are beveled or chamfered, and the entire section partaking of the dovetail form, so as to fit within the dovetail-slot *a* of the other section. From the rear face of the section D, and around a central opening, E, formed therein, is a ring, F, to which the other end of the hose is attached. At one end of one of the sides of the section A is an opening, *e*, through which is passed a thumb-screw, G, which engages with a recess or cut-away portion, *g*, in the adjacent side of the section D, and serves to hold the latter in place.

The operation of my invention is obvious. When the hose has been properly attached to the two sections of the coupling, the latter can be coupled in an instant by sliding the section D in the slot of the other section until the two central passages register with each other and the limit of the sliding movement has been reached, when the parts can be set in this position by turning the thumb-screw so as to engage with the cut-away portion *g*, thus locking the coupling.

It will be seen that the coupling of the sections can be readily performed, even while there is a flow of water in the hose, thereby adding an important feature for my device.

The rubber packing is to vary in size and width, according to the size of the hose and coupling, and is arranged to protrude from the front face of section A, so as to form an air and water tight connection between the two sections when coupled together.

The hose-sections are attached at their ends to the rings C F of the two sections of the coupling in the ordinary manner. By simply sliding the two sections together and tightening the thumb-screw the coupling is completed, the uncoupling being performed by reversing these movements.

Having described my invention, I claim—

1. In a hose-coupling, the section A, formed with a dovetailed slot, *a*, in combination with the other section, D, of a dovetail form, so as to fit entirely within the said slot, and a packing-ring fitted in a depression of the slot *a* in section A, as set forth.

2. In a hose-coupling, the section A, formed with a dovetailed slot, *a*, in combination with the other section, D, of a dovetail form, so as to fit entirely within the said slot, a thumb-screw working through one side of section A and engaging with the other section, and a packing-ring fitted in a depression, *c*, of the slot *a* of said section A, as set forth.

JAMES CUMMINS.

Witnesses:
S. D. CRUMP,
GARRET DOBSON.